United States Patent
Zhang et al.

(10) Patent No.: US 8,238,525 B2
(45) Date of Patent: Aug. 7, 2012

(54) VOICE RECOGNITION SERVER, TELEPHONE EQUIPMENT, VOICE RECOGNITION SYSTEM, AND VOICE RECOGNITION METHOD

(75) Inventors: Zhipeng Zhang, Yokohama (JP); Hirotaka Furukawa, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 323 days.

(21) Appl. No.: 12/693,796

(22) Filed: Jan. 26, 2010

(65) Prior Publication Data

US 2010/0195806 A1 Aug. 5, 2010

(30) Foreign Application Priority Data

Jan. 30, 2009 (JP) ................ P2009-020178

(51) Int. Cl.
*H04M 1/64* (2006.01)
*G10L 15/26* (2006.01)
(52) U.S. Cl. ................ 379/88.01; 704/235
(58) Field of Classification Search ........... 379/88.01; 704/235
See application file for complete search history.

(56) References Cited

U.S. PATENT DOCUMENTS 8,108,212 B2 * 1/2012 Maegawa ............ 704/235

FOREIGN PATENT DOCUMENTS

| JP | 2000-10590 | 1/2000 |
| JP | 2000-125006 | 4/2000 |
| JP | 2005-340962 | 12/2005 |

OTHER PUBLICATIONS

Office Action issued Aug. 11, 2011, in Chinese Patent Application No. 201010108535.2 (with English-language translation).
Wataru Sakurai, et al., "System Development of 2-in-1 Service", NTT DoCoMo Technical Journal, vol. 15, No. 3, pp. 11-19 (with English translation).
Kiyohiro Shikano, et al., "Voice Recognition System", Information Processing Society of Japan, ISBN/ASIN: 4274132285, pp. 94-95 (with English translation).
Koichi Shinoda, "Speaker Adaptation Techniques for Speech Recognition Using Probabilistic Models", Journal of Institute of Electronics Information and Communication, D-II, vol. J87-D-II, No. 2, pp. 371-386 (with English translation).
Office Action issued Apr. 19, 2012 in Chinese Patent Application No. 201010108535.2 (with English translation).
Office Action issued Apr. 24, 2012 in Japanese Patent Application No. P2009-020178 filed Jan. 30, 2009 (with English translation).

* cited by examiner

*Primary Examiner* — Davetta W Goins
*Assistant Examiner* — Mohammad Islam
(74) *Attorney, Agent, or Firm* — Oblon, Spivak, McClelland, Maier & Neustadt, L.L.P.

(57) ABSTRACT

A voice recognition server 200 has a voice reception unit 202 which receives a voice from a telephone equipment 100, a model storage unit 208 which stores at least one acoustic model and at least one language model used for converting the voice received by the voice reception unit 202, to character data, a number decision unit 204 which decides a current calling number and a second number of the telephone equipment 100, a model selection unit 206 which selects an acoustic model stored in the model storage unit 208, based on the current calling number and the second number, and which selects a language model stored in the model storage unit 208, based on the current calling number, and a voice recognition unit 210 which converts the voice received by the voice reception unit 202, to character data, based on the acoustic model and the language model selected by the model selection unit 206.

15 Claims, 16 Drawing Sheets

Fig.7

| TELEPHONE NUMBER | ACOUSTIC MODEL |
|---|---|
| A,B | $M_{AB}$ |
| C | $M_C$ |
| D,E | $M_{DE}$ |
| ⋮ | ⋮ |

Fig.8

| TELEPHONE NUMBER | LANGUAGE MODEL |
|---|---|
| A | $L_A$ |
| B | $L_B$ |
| C | $L_C$ |
| D | $L_D$ |
| E | $L_E$ |
| ⋮ | ⋮ |

| TELEPHONE NUMBER | USER ID |
|---|---|
| A | AB |
| B | AB |
| C | CC |
| D | DE |
| E | DE |
| ... | ... |

(B)

| USER ID | ACOUSTIC MODEL |
|---|---|
| AB | $M_{AB}$ |
| CC | $M_C$ |
| DE | $M_{DE}$ |
| ... | ... |

(A)

| TELEPHONE NUMBER | USER ID |
|---|---|
| A | AB |
| B | |
| C | CC |
| D | DE |
| E | |
| ... | ... |

(B)

| TELEPHONE NUMBER | USER ID |
|---|---|
| A | AB |
| B | |
| C | CC |
| D | DE |
| E | FF |
| F | |
| ... | ... |

VOICE RECOGNITION SERVER, TELEPHONE EQUIPMENT, VOICE RECOGNITION SYSTEM, AND VOICE RECOGNITION METHOD

BACKGROUND OF THE INVENTION

1. Field of the Invention

The present invention relates to a voice recognition server, telephone equipment, voice recognition system, and voice recognition method.

2. Related Background Art

There is the conventionally known technology of switching dictionaries for voice recognition according to telephone numbers in carrying out voice recognition of voices from users, for example, as disclosed in Patent Document 1. Furthermore, a service to allow a single terminal to use a plurality of telephone numbers and/or mail addresses (so called a 2-in-1 service) has been developed, for example, as disclosed in Non-patent Document 1.

Patent Document 1: Japanese Patent Application Laid-open No. 2000-10590

Non-patent Document 1: System development of 2-in-1 service, NTT DoCoMo Technical Journal, vol. 15, No. 3, P 11-19

SUMMARY OF THE INVENTION

Problem to be Solved by the Invention

The service using the conventional technology as described above has the following problem in the case where the same terminal uses a plurality of numbers and where different language models and acoustic models are prepared for the respective numbers. Namely, while utterances from the same terminal are normally voices of the same user, the accuracy of model will degrade and the performance of voice recognition may become lowered if the voice recognition is carried out using the different models for the respective different numbers or if individual updates are carried out for the respective different models.

The present invention has been accomplished in view of the above-described circumstances and it is an object of the present invention to provide a voice recognition server, telephone equipment, voice recognition system, and voice recognition method capable of enhancing the accuracy of model and improving the performance of voice recognition in the service allowing a single terminal to use a plurality of telephone numbers.

Means for Solving the Problem

In order to solve the above problem, a voice recognition server according to the present invention is a voice recognition server connected to a telephone equipment allowed to use a plurality of telephone numbers assigned to a single terminal and configured to convert a voice from the telephone equipment to character data, the voice recognition server comprising: voice receiving module which receives a voice from the telephone equipment; model storing module which stores at least one acoustic model and at least one language model used for converting the voice received by the voice receiving module, to character data; number deciding module which decides a current calling number being a currently calling telephone number of the telephone equipment, and a second number being a telephone number except for the current calling number out of the plurality of telephone numbers; model selecting module which selects an acoustic model stored in the model storing module, based on the current calling number and the second number, and which selects a language model stored in the model storing module, based on the current calling number; and voice recognition module which converts the voice received by the voice receiving module, to character data, based on the acoustic model and the language model selected by the model selecting module.

A telephone equipment according to the present invention is a telephone equipment connected to a voice recognition server for converting a voice to character data and allowed to use a plurality of telephone numbers assigned to a single terminal, the telephone equipment comprising: voice transmitting module which transmits a voice from a user to the voice recognition server; number detecting module which detects a current calling number being a currently calling telephone number of the telephone equipment, and a second number being a telephone number except for the current calling number out of the plurality of telephone numbers; and number notifying module which notifies the voice recognition server of the current calling number and the second number.

A voice recognition system according to the present invention is a voice recognition system comprising a telephone equipment allowed to use a plurality of telephone numbers assigned to a single terminal, and a voice recognition server for converting a voice from the telephone equipment to character data, wherein the telephone equipment comprises: voice transmitting module which transmits a voice from a user to the voice recognition server; number detecting module which detects a current calling number being a currently calling telephone number of the telephone equipment, and a second number being a telephone number except for the current calling number out of the plurality of telephone numbers; and number notifying module which notifies the voice recognition server of the current calling number and the second number, and wherein the voice recognition server comprises: voice receiving module which receives the voice from the telephone equipment; model storing module which stores at least one acoustic model and at least one language model used for converting the voice received by the voice receiving module, to character data; number deciding module which decides the current calling number and the second number, based on a notification from the number notifying module of the telephone equipment; model selecting module which selects an acoustic model stored in the model storing module, based on the current calling number and the second number, and which selects a language model stored in the model storing module, based on the current calling number; and voice recognition module which converts the voice received by the voice receiving module, to character data, based on the acoustic model and the language model selected by the model selecting module.

A voice recognition method according to the present invention is a voice recognition method in a voice recognition server connected to a telephone equipment allowed to use a plurality of telephone numbers assigned to a single terminal, and configured to convert a voice from the telephone equipment to character data, wherein model storing module of the voice recognition server stores at least one acoustic model and at least one language model used for converting a voice from the telephone equipment to character data, the voice recognition method comprising: a voice receiving step wherein voice receiving module of the voice recognition server receives a voice from the telephone equipment; a number deciding step wherein number deciding module of the voice recognition server decides a current calling number being a currently calling telephone number of the telephone equipment, and a second number being a telephone number except for the current calling number out of the plurality of telephone numbers; a model selecting step wherein model selecting module of the voice recognition server selects an acoustic model stored in the model storing module, based on the current calling number and the second number, and selects a language model stored in the model storing module, based on the current calling number; and a voice recognition step wherein voice recognition module of the voice recognition server converts the voice received by the voice receiving module, to character data, based on the acoustic model and the language model selected by the model selecting module.

In this case, the voice recognition server according to the present invention is preferably configured as follows: the model storing module stores an acoustic model common to all telephone numbers available for one telephone equipment, and the model selecting module selects the common acoustic model even if the current calling number and the second number as the basis for the selection are any combination in the one telephone equipment.

In the voice recognition server, telephone equipment, voice recognition system, and voice recognition method according to the present invention as described above, the model selecting module of the voice recognition server selects the acoustic model, based on both of the current calling number and the second number. Namely, the acoustic model selected is one common to both of the current calling number and the second number. This is because the present invention is based on the premise that the voice recognition is carried out in the telephone equipment for a user to use a plurality of telephone numbers assigned to a single terminal. Namely, the user is fixed even with different telephone numbers and therefore the use of the common acoustic model can enhance the performance of the voice recognition. The use of the common acoustic model offers an excellent effect, particularly, in execution of the voice recognition of a voice from a new number of the same terminal. Namely, it is highly likely in the conventional technology that with a new number, the update is not adequately carried out for the available acoustic model, and it is thus often the case that the performance of the voice recognition for the new number is inevitably lower. Since the present invention permits the use of the acoustic model corresponding to the existing number for the voice from the new number, the accuracy of recognition becomes higher for the voice from the new number. The use of the common acoustic model permits reduction in the number of acoustic models to be stored in the model storing module of the voice recognition server, which can reduce the capacity for storage of acoustic models. On the other hand, as to the language model, the user is assumed to be single, but because topics can differ depending upon telephone numbers, the model selecting module of the voice recognition server according to the present invention selects the language model, based on only the current calling number. Namely, it selects the language model specific to the current calling number.

The voice recognition server according to the present invention preferably further comprises acoustic model updating module which updates the common acoustic model, using all voices from the one telephone equipment.

When the common acoustic model is updated using all voices from one telephone equipment, the update of the acoustic model can be accurately performed. It is because the amount of learning for the update increases when compared with the case where the acoustic model is updated on a number-by-number basis.

The voice recognition server according to the present invention preferably further comprises language model updating module which updates language models for respective telephone numbers, using recognition results of voices on the respective telephone numbers out of all voices from the telephone equipment.

Since the language models for the respective telephone numbers are updated using the recognition results of the voices on the respective telephone numbers, when topics differ depending upon the telephone numbers, the language models specific to the respective topics can be updated.

The voice recognition server according to the present invention may be configured as follows: it further comprises data storing module which stores the plurality of telephone numbers available for the telephone equipment and user identification information of the telephone equipment in correspondence to each other, and the model selecting module selects the user identification information stored in the data storing module, based on the current calling number and the second number, and selects the acoustic model stored in the model storing module, based on the selected user identification information.

In this case, the model selecting module can select different acoustic models for respective users.

The voice recognition server according to the present invention may further comprise correspondence relation controlling module which performs a process of addition, change, or deletion, in a correspondence relation between the plurality of telephone numbers and the user identification information stored in the data storing module.

In this case, the correspondence relation between telephone numbers and users can be controlled.

The voice recognition server of the present invention may be configured as follows: the voice receiving module further receives mode identification information to which the model selecting module refers in order to select the acoustic model and the language model, and the model selecting module selects the acoustic model and the language model, based on the mode identification information.

In this case, the model selecting module can select the acoustic model and the language model according with a mode.

The voice recognition server according to the present invention may be configured as follows: when the voice receiving module receives a plurality of pieces of the mode identification information, the model selecting module selects the acoustic model and the language model, based on a piece of mode identification information with a high priority rank.

In this case, the model selecting module can select the acoustic model and the language model according with a mode, with further consideration to the priority rank of the mode.

The voice recognition server according to the present invention may be configured as follows: the voice receiving module further receives attribute information of a user of the telephone equipment, and the model selecting module selects the acoustic model and the language model with further reference to the attribute information.

In this case, the model selecting module can select the acoustic model and the language model according with the attribute information of the user, with further reference to the attribute information of the user.

Another telephone equipment according to the present invention is a telephone equipment allowed to use a plurality of telephone numbers assigned to a single terminal, the telephone equipment comprising: voice input module which imports a voice from a user; number detecting module which detects a current calling number being a currently calling telephone number of the telephone equipment, and a second number being a telephone number except for the current calling number out of the plurality of telephone numbers; model storing module which stores an acoustic model and a language model used for converting the voice imported by the voice input module, to character data; model selecting module which selects an acoustic model stored in the model storing module, based on the current calling number and the second number, and which selects a language model stored in the model storing module, based on the current calling number; and voice recognition module which converts the voice imported by the voice input module, to character data, based on the acoustic model and the language model selected by the model selecting module.

In this case, the telephone equipment according to the present invention is preferably configured so that the model storing module stores an acoustic model common to all the telephone numbers available for the telephone equipment and so that the model selecting module selects the common acoustic model even if the current calling number and the second number as the basis for the selection are any combination in the telephone equipment.

In the telephone equipment according to the present invention as described above, the model selecting module of the telephone equipment selects the acoustic model, based on both of the current calling number and the second number. Namely, it selects the acoustic model common to both of the current calling number and the second number. This is because the present invention is based on the premise that the voice recognition is carried out in the telephone equipment for a user to use a plurality of telephone numbers assigned to the single terminal. Namely, the user is fixed even with different telephone numbers and therefore the use of the common acoustic model can enhance the performance of the voice recognition. The use of the common acoustic model offers an excellent effect, particularly, in execution of the voice recognition of a voice from a new number of the same terminal. Namely, it is highly likely in the conventional technology that with a new number, the update is not adequately carried out for the available acoustic model, and it is thus often the case that the performance of the voice recognition for the new number is inevitably lower. Since the present invention permits the use of the acoustic model corresponding to the existing number for the voice from the new number, the accuracy of recognition becomes higher for the voice from the new number. The use of the common acoustic model permits reduction in the number of acoustic models to be stored in the model storing module of the telephone equipment, which can reduce the capacity for storage of acoustic models. On the other hand, as to the language model, the user is assumed to be single, but because topics can differ depending upon the telephone numbers, the model selecting module of the telephone equipment according to the present invention selects the language model, based on only the current calling number. Namely, it selects the language model specific to the current calling number.

The telephone equipment according to the present invention preferably further comprises acoustic model updating module which updates the common acoustic model, using all voices from the user.

When the common acoustic model is updated using all the voices from the user, the update of the acoustic model can be accurately performed. It is because the amount of learning for the update increases when compared with the case where the acoustic model is updated on a number-by-number basis.

The telephone equipment according to the present invention preferably further comprises language model updating module which updates language models for respective telephone numbers, using recognition results of voices on the respective telephone numbers out of all voices from the user.

Since the language models for the respective telephone numbers are updated using the recognition results of the voices on the respective telephone numbers, when topics are different depending upon the telephone numbers, the language models specific to the topics can be updated.

EFFECT OF THE INVENTION

The present invention successfully provides the voice recognition server, telephone equipment, voice recognition system, and voice recognition method capable of enhancing the accuracy of the model and improving the performance of the voice recognition in the service permitting a single terminal to use a plurality of telephone numbers.

BRIEF DESCRIPTION OF THE DRAWINGS

FIG. 7 is a drawing for detailing an acoustic model selecting process of step S104 in FIG. 6.

FIG. 8 is a drawing for detailing a language model selecting process of step S105 in FIG. 6.

FIG. 10A is a drawing showing an example in which telephone numbers and user IDs are stored in correspondence to each other in number conversion data storage unit 214.

FIG. 10B is a drawing showing an example in which user IDs and acoustic models are stored in correspondence to each other in model storage unit 208.

LIST OF REFERENCE SYMBOLS 1, 2 voice recognition system; 100, 150 telephone equipment; 102 voice input unit; 104 voice transmission unit; 106 number detection unit; 108 number notification unit; 110 model selection unit; 112 model storage unit; 114 voice recognition unit; 116 model update unit; 200, 250, 260 voice recognition server; 202 voice reception unit; 204 number decision unit; 206 model selection unit; 208 model storage unit; 210 voice recognition unit; 212 model update unit; 214 number conversion data storage unit; 216 number conversion unit; 218 number control unit; 220 mode identification information reception unit; 300 communication network; 400 subscriber information control device.

DESCRIPTION OF THE PREFERRED EMBODIMENTS

The preferred embodiments of the voice recognition server, telephone equipment, voice recognition system, and voice recognition method according to the present invention will be described below in detail with reference to the accompanying drawings. In the description of the drawings identical elements will be denoted by the same reference symbols, without redundant description.

<First Embodiment>

(Overall Configuration of Voice Recognition System 1)

Figure 1:
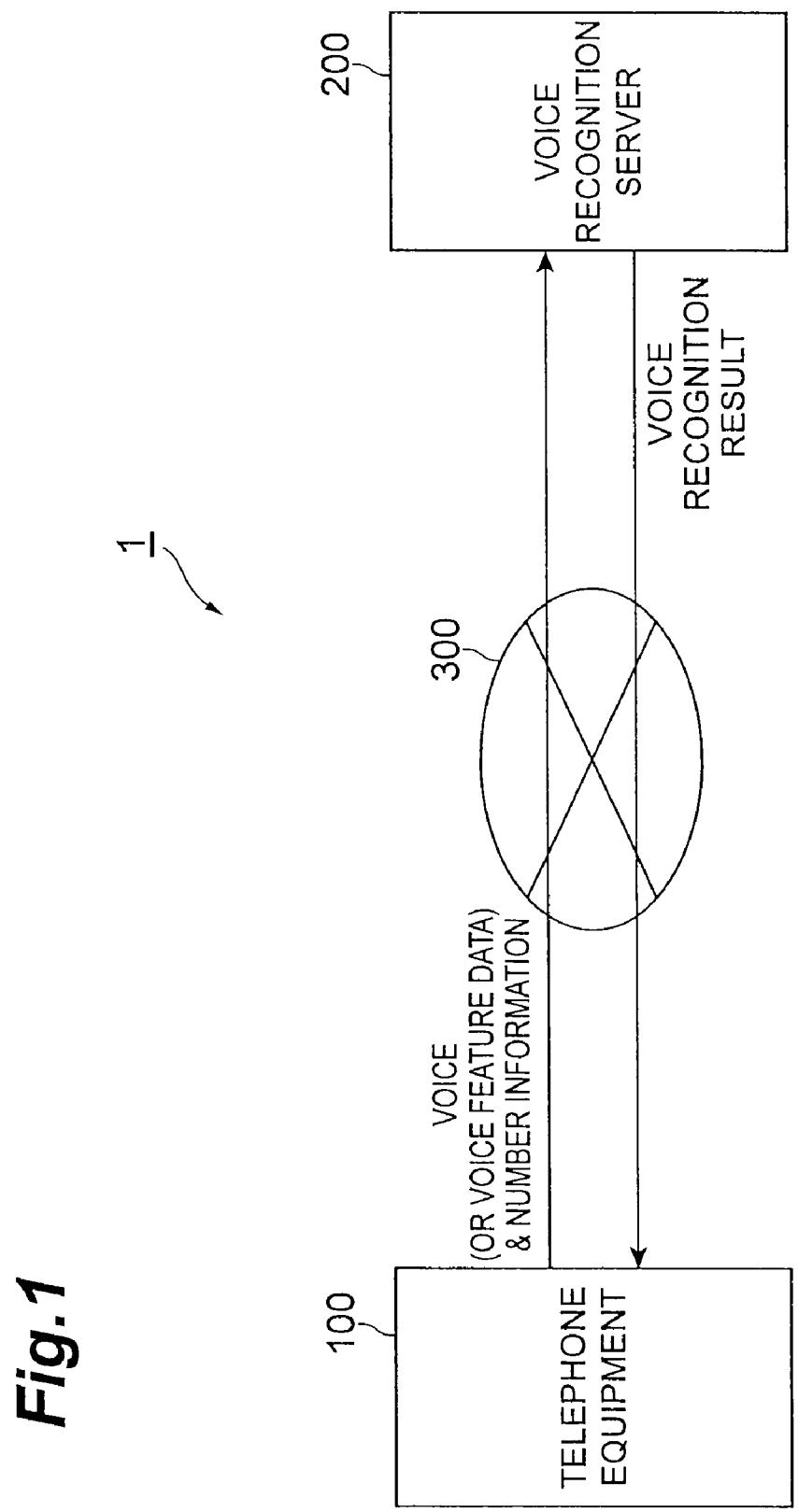
FIG. 1 is a schematic configuration diagram of voice recognition system 1 according to the first embodiment.
Figure 2:
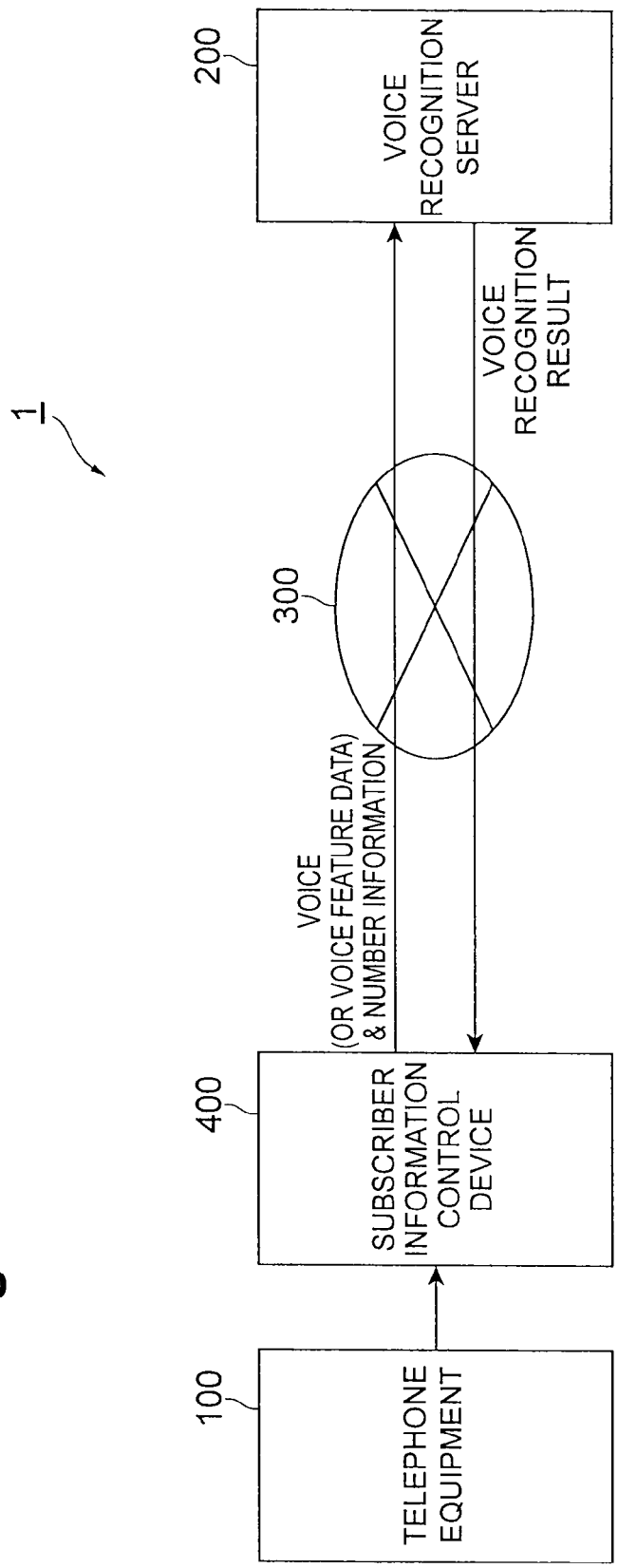
FIG. 2 is a schematic configuration diagram of voice recognition system 1 according to the first embodiment.

First, the overall configuration of voice recognition system 1 according to the first embodiment of the present invention will be described with reference to FIGS. 1 and 2. FIG. 1 and FIG. 2 are schematic views of configurations of the voice recognition system 1. As shown in FIG. 1, the voice recognition system 1 is composed of a telephone equipment 100 and a voice recognition server 200, and the telephone equipment 100 and the voice recognition server 200 are connected to each other through a communication network 300. The telephone equipment 100 is a cell phone set that is allowed to use a plurality of telephone numbers and/or mail addresses assigned to a single terminal (which is so called "2-in-1 service" in Japan). The voice recognition server 200 is a server equipment that converts a voice from the telephone equipment 100 to character data and sends the resultant character data to the telephone equipment 100. As shown in FIG. 2, the voice recognition system 1 may be configured as further provided with a subscriber information control device 400. The subscriber information control device 400 is a device that controls and manages subscriber information in the so-called "2-in-1 service."

(Configuration of Telephone Equipment 100)

Figure 3:
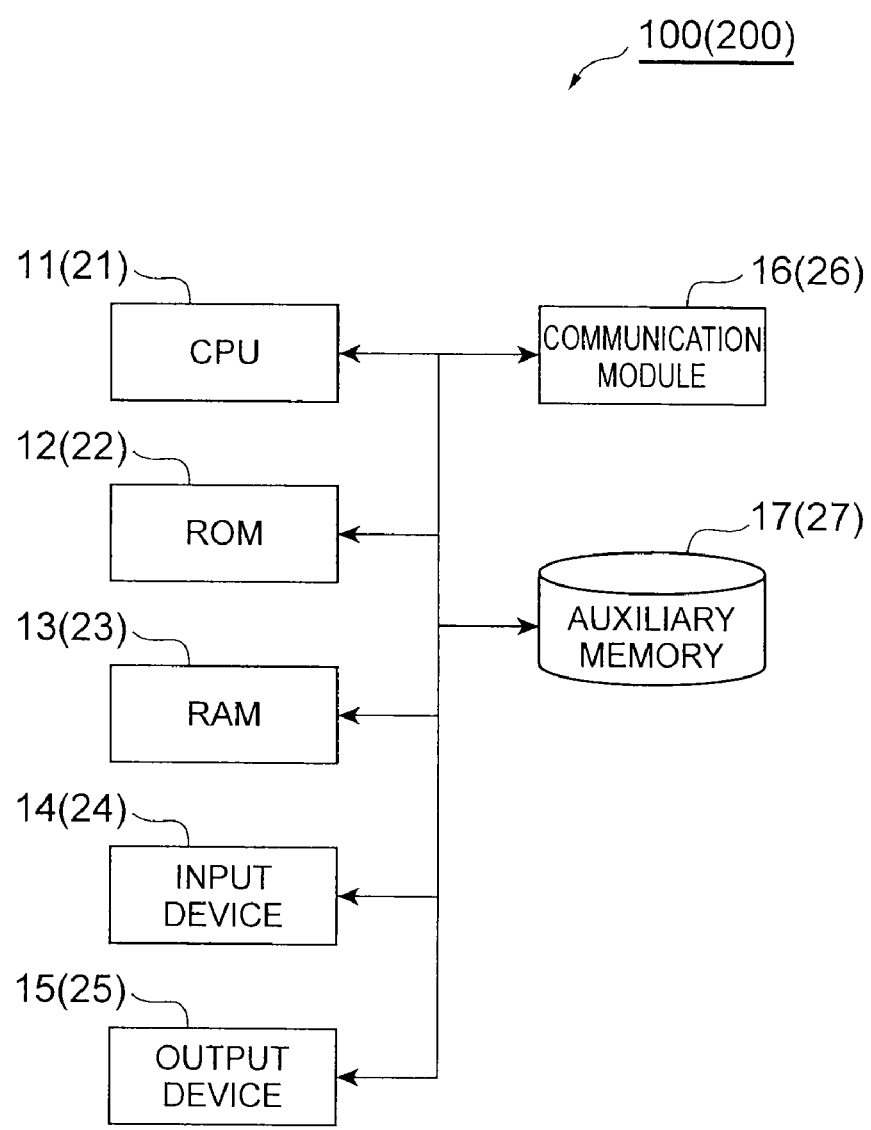
FIG. 3 is a hardware configuration diagram of telephone equipment 100 and voice recognition server 200.

The telephone equipment 100 will be described in detail. FIG. 3 is a hardware configuration diagram of the telephone equipment 100. As shown in FIG. 3, the telephone equipment 100 is physically configured with a CPU 11, a ROM 12 and a RAM 13 which are main memory units, an input device 14 such as operation buttons, an output device 15 such as an LCD or organic EL display, a communication module 16 to transmit and receive data to and from the voice recognition server 200, and an auxiliary memory unit 17 such as a memory device. Each of functions of the telephone equipment 100 described below is implemented by loading predetermined software onto the hardware such as the CPU 11, ROM 12, and RAM 13, thereby letting the input device 14, output device 15, and communication module 16 operate under control of the CPU 11, and reading and writing data from and into the main memory units 12, 13 and/or the auxiliary memory unit 17.

Figure 4:
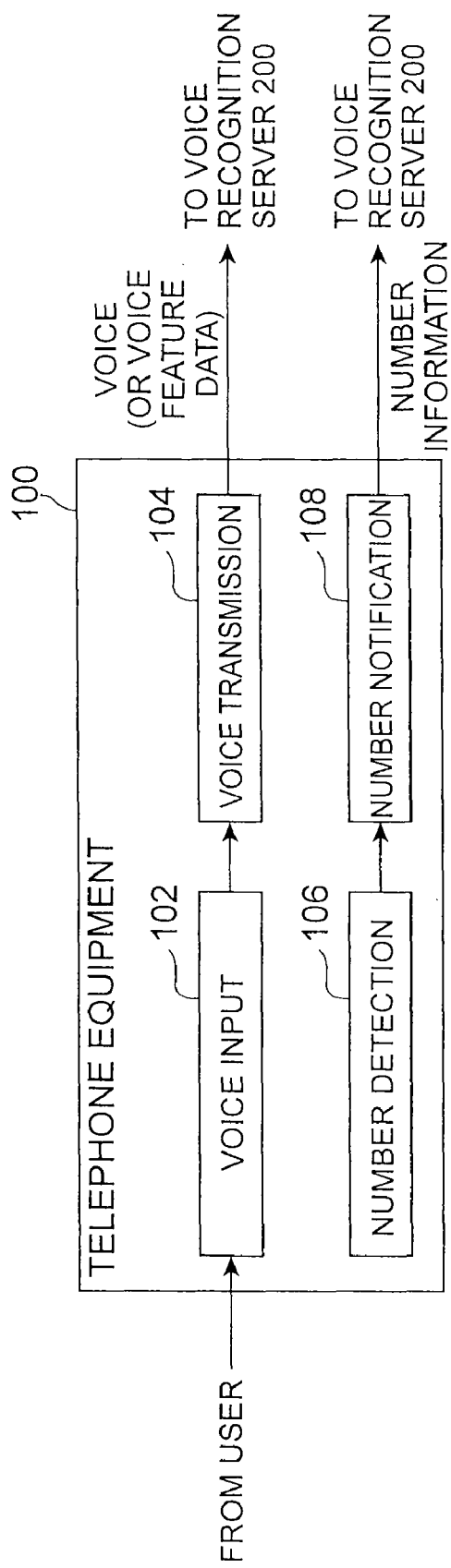
FIG. 4 is a schematic configuration diagram showing a functional configuration of telephone equipment 100.

FIG. 4 is a schematic configuration diagram showing a functional configuration of the telephone equipment 100. As shown in FIG. 4, the telephone equipment 100 is functionally configured with a voice input unit 102, a voice transmission unit 104 (corresponding to "voice transmitting module" in claims), a number detection unit 106 (corresponding to "number detecting module" in claims), and a number notification unit 108 (corresponding to "number notifying module" in claims).

The voice input unit 102 is a unit that imports a voice uttered by a user. The voice transmission unit 104 is a unit that transmits the voice imported by the voice input unit 102, to the voice recognition server 200. The telephone equipment 100 may also be configured so as to be further provided with a module for extracting voice features from the voice imported by the voice input unit 102, which is not shown, and so as to let the voice transmission unit 104 transmit the voice feature data to the voice recognition server 200. The voice transmission unit 104 can be constructed, for example, of the communication module 16 shown in FIG. 3.

The number detection unit 106 is a unit that detects a current calling number and a second number. The current calling number is a currently calling telephone number of the telephone equipment 100. The second number is a telephone number except for the current calling number out of the plurality of telephone numbers available for the telephone equipment 100. The number notification unit 108 is a unit that notifies the voice recognition server 200 of the current calling number and the second number detected by the number detection unit 106. The number notification unit 108 can be constructed, for example, of the communication module 16 shown in FIG. 3.

The system may be configured so that the telephone equipment 100 directly transmits the voice (voice feature data) and the number information to the voice recognition server 200, as shown in FIGS. 1 and 4, or the system may be configured so that the telephone equipment 100 transmits the voice (voice feature data) and the number information through the subscriber information control device 400 to the voice recognition server 200, as shown in FIG. 2. In the latter case, the module equivalent to the number detection unit 106 and the number notification unit 108 may be located in the subscriber information control device 400, which is not shown.

(Configuration of Voice Recognition Server 200)

Next, the voice recognition server 200 will be described in detail. FIG. 3 is a hardware configuration diagram of the voice recognition server 200. As shown in FIG. 3, the voice recognition server 200 is physically constructed as an ordinary computer system including a CPU 21, main memory units such as a ROM 22 and a RAM 23, an input device 24 such as a keyboard and a mouse, an output device 25 such as a display, a communication module 26 to transmit and receive data to and from the telephone equipment 100, an auxiliary memory unit 27 such as a hard disk, and so on. Each of functions of the voice recognition server 200 described below is implemented by loading predetermined computer software onto the hardware such as the CPU 21, ROM 22, and RAM 23, thereby letting the input device 24, output device 25, and communication module 26 operate under control of the CPU 21, and reading and writing data from and into the main memory units 22, 23 and/or the auxiliary memory unit 27.

Figure 5:
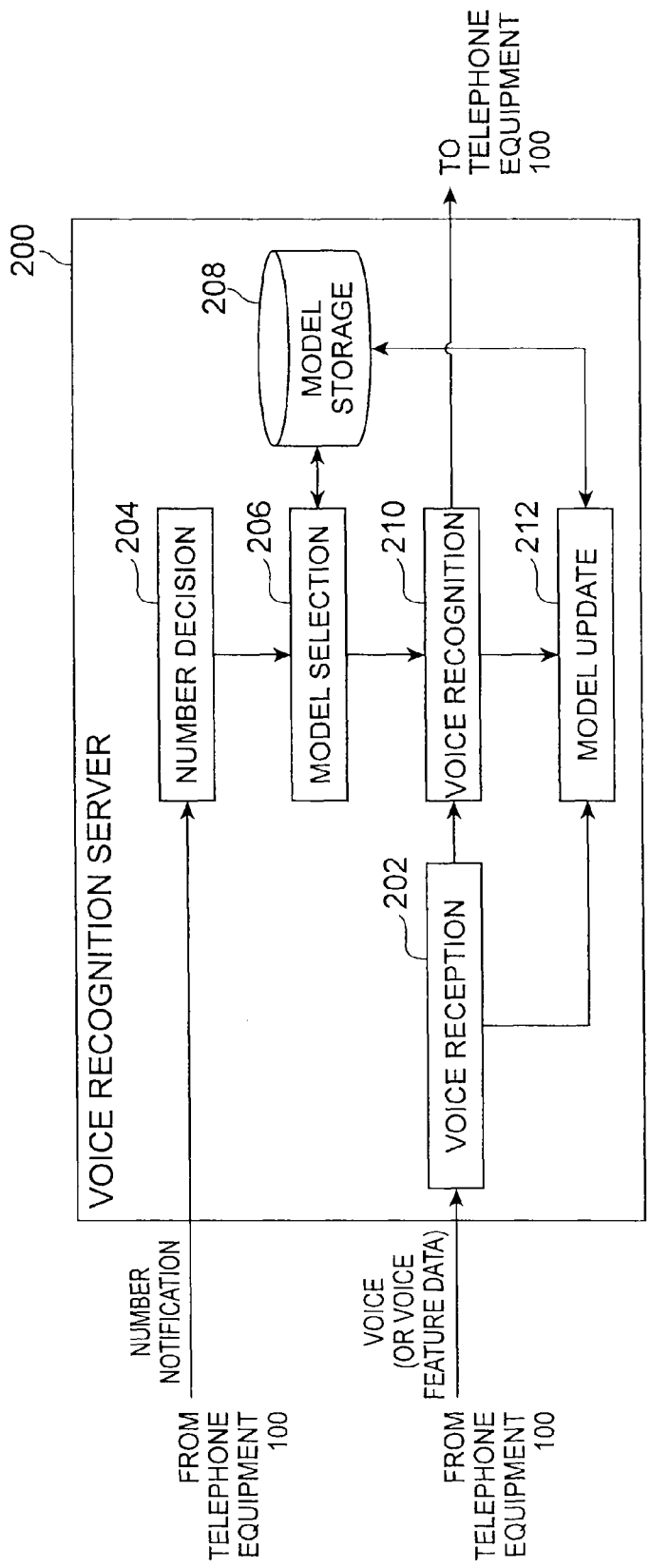
FIG. 5 is a schematic configuration diagram showing a functional configuration of voice recognition server 200.

FIG. 5 is a schematic configuration diagram showing a functional configuration of the voice recognition server 200. As shown in FIG. 5, the voice recognition server 200 is functionally configured with a voice reception unit 202 (corresponding to "voice receiving module" in claims), a number decision unit 204 (corresponding to "number deciding module" in claims), a model selection unit 206 (corresponding to "model selecting module" in claims), a model storage unit 208 (corresponding to "model storing module" in claims), a voice recognition unit 210 (corresponding to "voice recognition module" in claims), and a model update unit 212 (corresponding to "acoustic model updating module" and "language model updating module" in claims).

The voice reception unit 202 is a unit that receives a voice uttered by the user of the telephone equipment 100 or feature data thereof from the telephone equipment 100. In the case of the configuration wherein the voice recognition system 1 is configured including the subscriber information control device 400 as shown in FIG. 2, the voice reception unit 202 may be configured to receive the voice or the feature data thereof from the telephone equipment 100 through the subscriber information control device 400. The voice reception unit 202 can be constructed, for example, of the communication module 26 shown in FIG. 3. The voice reception unit 202 outputs the received voice or feature data thereof to the voice recognition unit 210 and to the model update unit 212.

The number decision unit 204 decides the current calling number and the second number of the telephone equipment 100, based on the notification from the number notification unit 108 of the telephone equipment 100. In the case of the other configuration wherein the voice recognition system 1 is constructed including the subscriber information control device 400 as shown in FIG. 2, the number decision unit 204 may be configured to receive the notification of the current calling number and second number from the subscriber information control device 400 and to decide the current calling number and the second number of the telephone equipment 100, based on the notification, which is not shown in FIG. 5. The number decision unit 204 outputs the decided current calling number and second number to the model selection unit 206.

The model selection unit 206 is a unit that selects an acoustic model stored in the model storage unit 208, based on the current calling number and second number decided by the number decision unit 204, and that selects a language model stored in the model storage unit 208, based on the current calling number. The model storage unit 208 is a unit that stores at least one acoustic model and at least one language model to be used for converting the voice received by the voice reception unit 202, to character data. The model storage unit 208 stores an acoustic model common to all telephone numbers available for one telephone equipment and the model selection unit 206 selects the common acoustic model even if the current calling number and second number are the basis for the selection are any combination in the one telephone equipment. The detailed processing associated with the model selection unit 206 and the model storage unit 208 will be described in detail with reference to FIGS. 7 and 8 in below-described "Operation of Voice Recognition System 1." The model selection unit 206 outputs the selected acoustic model and language model to the voice recognition unit 210.

The voice recognition unit 210 is a unit that converts the voice received by the voice reception unit 202, to character data, based on the acoustic model and language model selected by the model selection unit 206. The voice recognition technique itself is the well-known technology, for example, as disclosed in Reference Document 1 below, and therefore the description thereof is omitted herein. The voice recognition unit 210 transmits the result of the voice recognition process to the telephone equipment 100. The telephone equipment 100 receives the result and displays it for the user. The voice recognition unit 210 also outputs the voice recognition result to the model update unit 212.

Reference Document 1: Onsei Ninshiki Shisutemu (Voice Recognition System), ISBN/ASIN: 4274132285, Kazuya Takeda, Ohmsha, Ltd.

The model update unit 212 is a unit that updates the acoustic model and language model stored in the model storage unit 208, using the voice from the telephone equipment 100 received by the voice reception unit 202 and the voice recognition result received from the voice recognition unit 210, as objects of learning. The model update unit 212 updates the common acoustic model in one telephone equipment, using all voices from the telephone equipment 100 and all voice recognition results from the voice recognition unit 210, as objects of learning. Specifically, for example, in a case where the telephone numbers available for the telephone equipment 100 are A and B, the model update unit 212 updates the common acoustic model to the telephone numbers A and B in the telephone equipment 100, using all voices uttered on the telephone numbers A and B, and all recognition results of the voices, as objects of learning.

On the other hand, the model update unit 212 updates the language model per telephone number, using voice recognition results discriminated for the respective telephone numbers out of all the voice recognition results from the voice recognition unit 210. Specifically, for example, in the case where the telephone numbers available for the telephone equipment 100 are A and B, the model update unit 212 updates the language model for the telephone number A of the telephone equipment 100, using the recognition result (or character data) of the voice uttered on the telephone number A, as an object of learning. In this case, the model update unit 212 also updates the language model for the telephone number B of the telephone equipment 100, using the recognition result of the voice uttered on the telephone number B, as an object of learning.

A model update technique, i.e., a method of updating each of parameters in the acoustic model and the language model can be, for example, an update method based on Eq (1) below.

$$\mu = \mu 0 w + (1-w)X \quad (1)$$

In Eq (1) above, μ is a parameter after the update, μ0 a parameter before the update, w a predetermined weight in the update, and X an average of input voices. The model update technique itself is the well-known technology, for example, as disclosed in Reference Document 2 below, and thus the description thereof is omitted herein.

Reference Document 2: "Speaker Adaptation Techniques for Speech Recognition by Probability Model," IEICE Transactions D-II vol. J87-D-II, No. 2, pp. 371-386 (February 2004)

(Operation of Voice Recognition System 1)

Figure 6:
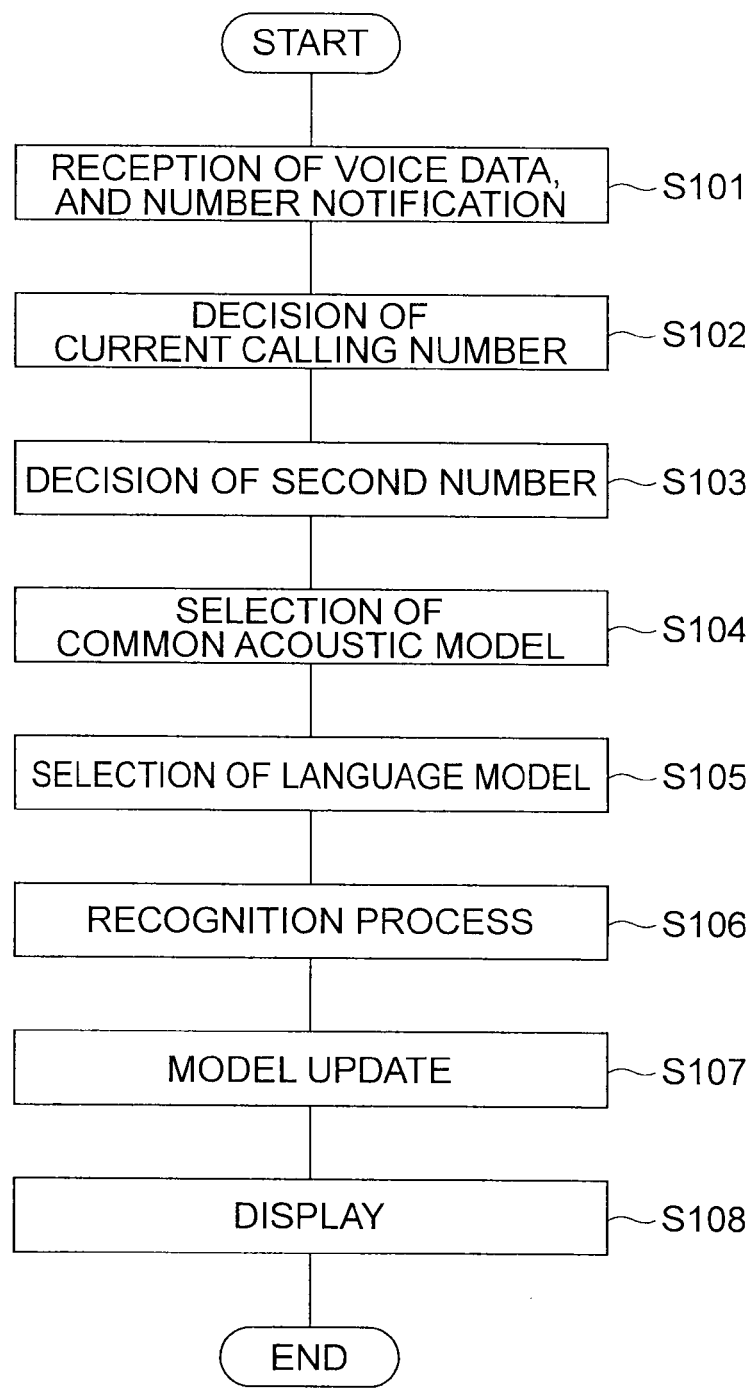
FIG. 6 is a flowchart showing an operation performed by voice recognition system 1.

The operation ("voice recognition method" in claims) carried out by the voice recognition system 1 will be described below with reference to FIG. 6. FIG. 6 is a flowchart showing the operation carried out by the voice recognition system 1. The description below is based on the following assumption, for convenience' sake of description. Namely, a plurality of telephone numbers, telephone numbers A and B, are available for the telephone equipment 100, the telephone number A out of them is the current calling number, and the telephone number B is the second number. As well as storing the acoustic model and language model used for converting the voice from the telephone equipment 100 to character data, the model storage unit 208 of the voice recognition server 200 also stores acoustic models and language models for recognition of voices from telephone equipments (not shown) other than the telephone equipment 100 existing in the voice recognition system 1.

First, the voice reception unit 202 of the voice recognition server 200 receives a voice uttered by the user of the telephone equipment 100 or feature data thereof directly from the telephone equipment 100 or through the subscriber information control device 400. The number decision unit 204 of the voice recognition server 200 receives a notification of the current calling number and second number from the telephone equipment 100 or from the subscriber information control device 400 (step S101, corresponding to "voice receiving step" in claims).

Next, the number decision unit 204 of the voice recognition server 200 decides the current calling number and second number of the telephone equipment 100, based on the number notification in step S101. According to the aforementioned assumption, the number decision unit 204 decides that the current calling number is A and the second number is B (step S102 and step S103, corresponding to "number deciding step" in claims).

Then the model selection unit 206 of the voice recognition server 200 selects the acoustic model for recognition of the voice from the telephone equipment 100 stored in the model storage unit 208, based on the current calling number and second number decided in step S102 and step S103. Furthermore, the model selection unit 206 selects the language model for recognition of the voice from the telephone equipment 100 stored in the model storage unit 208, based on the current calling number (step S104 and step S105, corresponding to "model selecting step" in claims).

The acoustic model selection process of step S104 will be described further with reference to FIG. 7. The model storage unit 208 stores a table as shown in FIG. 7. FIG. 7 shows the table storing telephone numbers (A, B, C, D, E, and so on) available for all telephone equipments in the voice recognition system 1, including the telephone equipment 100, and acoustic models ($M_{AB}$, $M_C$, $M_{DE}$, and so on) used for converting voices uttered on respective telephone numbers, to character data, in correspondence to each other. Specifically, a voice uttered on the telephone number A can be voice-recognized using the acoustic model $M_{AB}$ and a voice uttered on the telephone number C can be voice-recognized using the acoustic model $M_C$. In FIG. 7, telephone numbers described in one cell indicate telephone numbers available for one telephone equipment. Specifically, the telephone numbers A and B are numbers available for the telephone equipment 100, the telephone number C is a number available for another telephone equipment (not shown) except for the telephone equipment 100, and the telephone numbers D and E are numbers available for still another telephone equipment (not shown) except for the telephone equipment 100. The model selection unit 206 selects an acoustic model with reference to the table as described above. Namely, the model selection unit 206 searches the left column of the table in FIG. 7 for the telephone numbers A and B corresponding to the current calling number and second number of the telephone equipment 100, and selects the acoustic model $M_{AB}$ stored in correspondence to the telephone numbers A and B. This example is an example where the current calling number is A and the second number is B, but similar selection is also carried out in the reverse case where the current calling number is B and the second number is A. Namely, the model storage unit 208 stores an acoustic model common to all telephone numbers available for one telephone equipment and the model selection unit 206 selects the common acoustic model even if the current calling number and second number as the basis for the selection are any combination in the one telephone equipment.

The language model selection process of step S105 will be described further with reference to FIG. 8. The model storage unit 208 stores a table as shown in FIG. 8. FIG. 8 shows the table storing telephone numbers (A, B, C, D, E, and so on) available for all telephone equipments in the voice recognition system 1, including the telephone equipment 100, and language models ($L_A$, $L_B$, $L_C$, $L_D$, $L_E$, and so on) used for converting voices uttered on respective telephone numbers, to character data, in correspondence to each other. Specifically, a voice uttered on the telephone number A can be voice-recognized using the language model $L_A$ and a voice uttered on the telephone number C can be voice-recognized using the language model $L_C$. The model selection unit 206 selects a language model with reference to the table as described above. Specifically, the model selection unit 206 searches the left column of the table in FIG. 8 for the telephone number A corresponding to the current calling number of the telephone equipment 100 and selects the language model $L_A$ stored in correspondence to the telephone number A. This example is an example where the current calling number is A and the second number is B, but in the reverse case where the current calling number is B and the second number is A, the model selection unit 206 searches the left column of the table in FIG. 8 for the telephone number B corresponding to the current calling number of the telephone equipment 100 and selects the language model $L_B$ stored in correspondence to the telephone number B. Namely, the model storage unit 208 stores different language models for all respective telephone numbers available for one telephone equipment and the model selection unit 206 selects the different language models for the respective telephone numbers.

Returning to the flowchart of FIG. 6, after completion of the model selection procedure of step S104 and step S105, the voice recognition unit 210 of the voice recognition server 200 converts the voice received by the voice reception unit 202, to character data, based on the acoustic model and language model selected by the model selection unit 206. According to the aforementioned assumption, the voice recognition unit 210 performs the recognition process for the voice from the telephone equipment 100, based on the acoustic model $M_{AB}$ and the language model $L_A$ (step S106, corresponding to "voice recognition step" in claims).

Next, the model update unit 212 of the voice recognition server 200 updates the acoustic model and language model stored in the model storage unit 208, using the voice from the telephone equipment 100 received by the voice reception unit 202 and the voice recognition result received from the voice recognition unit 210, as objects of learning. According to the aforementioned assumption, the model update unit 212 updates the acoustic model $M_{AB}$ common to the telephone numbers A and B in the telephone equipment 100, using all voices uttered on the telephone numbers A and B and all recognition results of the voices, as objects of learning. Since the aforementioned assumption is that the current calling number is A, the common acoustic model $M_{AB}$ is updated using a voice uttered on the telephone number A and the recognition result of the voice as objects of learning. In the case where the current calling number is B, different from the foregoing case, the common acoustic model $M_{AB}$ is also updated using a voice uttered on the telephone number B and the recognition result of the voice as objects of learning. The point is that the common acoustic model $M_{AB}$ is updated based on both of the utterance on the calling number A and the utterance on the calling number B. On the other hand, the model update unit 212 updates the language models for the respective telephone numbers, using recognition results (or character data) of voices discriminated for the respective telephone numbers, out of all voices from the telephone equipment 100, as objects of learning. According to the aforementioned assumption, the model update unit 212 updates the language model $L_A$ for the telephone number A of the telephone equipment 100, using the recognition result of the voice uttered on the telephone number A being the current calling number, as an object of learning. This means that the language model is updated per calling number (step S107).

Finally, the result of the voice recognition in step S106 is received and displayed for the user by the telephone equipment 100 (step S108).

(Action and Effect and Others of First Embodiment)

The below will describe the action and effect of the first embodiment. In the first embodiment, the model selection unit 206 of the voice recognition server 200 selects the acoustic model, based on both the current calling number and the second number. Namely, it selects the acoustic model common to both of the current calling number and the second number. This is because the present embodiment is based on the premise that the voice recognition is carried out in the telephone equipment 100 for a user to use a plurality of telephone numbers assigned to one terminal. Namely, the user is fixed even with different telephone numbers, and therefore the use of the common acoustic model enhances the performance of the voice recognition. The use of the common acoustic model offers an excellent effect, particularly, in execution of voice recognition for a voice from a new number of an identical terminal. Namely, it is highly likely in the conventional technology that the update for the available acoustic model is not adequately carried out with a new number, and it is therefore often the case that the performance of the voice recognition for the new number inevitably becomes lower. Since the present embodiment permits the acoustic model for the existing numbers to be used for the voice from the new number, the accuracy becomes higher for the recognition of the voice from the new number. The use of the common acoustic model allows reduction in the number of acoustic models to be stored in the model storage unit 208 of the voice recognition server 200, which permits reduction in capacity for storage of acoustic models. On the other hand, concerning the language models, the user is assumed to be single, but because topics can differ on respective telephone numbers, the model selection unit 206 of the voice recognition server 200 in the present embodiment selects the language model, based on only the current calling number. Namely, it selects the language model specific to the current calling number.

Since the common acoustic model is updated using all voices from one telephone equipment 100, the update of the acoustic model can be accurately performed. This is because the amount of learning for the update increases when compared with the case where the acoustic model is updated on a number-by-number basis.

Since the language model per telephone number is updated using the recognition result of the voice on each telephone number, when topics are different on the respective telephone numbers, it is feasible to update the language models specific to the respective topics.

<Second Embodiment>

The second embodiment of the present invention will be described below. The second embodiment will be described with focus on differences from the first embodiment, while omitting the description of redundant portions with the first embodiment described above.

Figure 9:
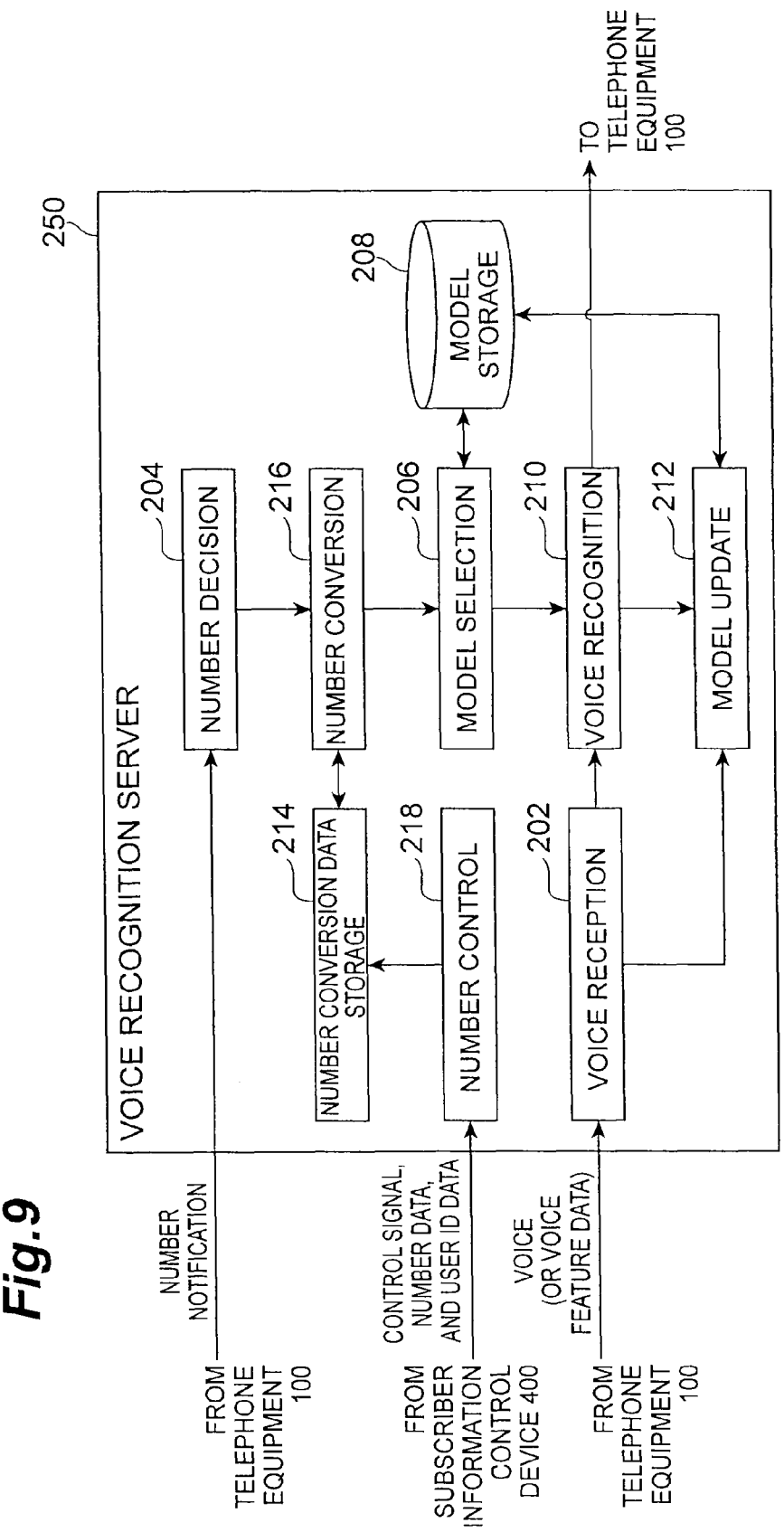
FIG. 9 is a schematic configuration diagram of voice recognition server 250 according to the second embodiment.

FIG. 9 is a schematic configuration diagram of voice recognition server 250 according to the second embodiment. When compared with the voice recognition server 200 in the first embodiment, the voice recognition server 250 is further provided with a number conversion data storage unit 214 (corresponding to "data storing module" in claims), a number conversion unit 216 (corresponding to "model selecting module" in claims), and a number control unit 218 (corresponding to "correspondence relation controlling module" in claims).

The number conversion data storage unit 214 stores a plurality of telephone numbers available for one telephone equipment and user identification information of the one telephone equipment in correspondence to each other. Specifically, the number conversion data storage unit 214 stores a table as shown in FIG. 10A. FIG. 10A shows the table storing telephone numbers (A, B, C, D, E, and so on) available for all telephone equipments in the voice recognition system 1, including the telephone equipment 100, and user IDs being identification information of users using the respective telephone numbers, in correspondence to each other. Specifically, as shown in FIG. 10A, the telephone numbers A and B are used by the user with the user ID of AB, the telephone number C is used by the user with the user ID of CC, and the telephone numbers D and E are used by the user with the user ID of DE.

Returning to FIG. 9, the number decision unit 204 decides the current calling number and second number of the telephone equipment 100, based on the number notification from the telephone equipment 100 or from the subscriber information control device 400, and outputs the result thereof to the number conversion unit 216.

The number conversion unit 216 selects a user ID stored in the number conversion data storage unit 214, based on the current calling number and second number decided by the number decision unit 204. For example, in the case where the telephone numbers available for the telephone equipment 100 are A and B, the number conversion unit 216 selects the user ID of AB with reference to the number conversion data storage unit 214. The number conversion unit 216 notifies the model selection unit 206 of the selected user ID.

The model selection unit 206 selects the acoustic model stored in the model storage unit 208, based on the user ID selected by the number conversion unit 216. The model storage unit 208 stores a table as shown in FIG. 10B. FIG. 10B shows the table storing user IDs (AB, CC, DE, and so on) being identification information of users of all telephone equipments in the voice recognition system 1, including the telephone equipment 100, and acoustic models ($M_{AB}$, $M_C$, $M_{DE}$, and so on) used in execution of the voice recognition in association with the respective user IDs, in correspondence to each other. Specifically, in the case of the user ID of AB, the voice recognition can be performed using the acoustic model $M_{AB}$; in the case of the user ID of CC, the voice recognition can be performed using the acoustic model $M_C$; in the case of the user ID of DE, the voice recognition can be performed using the acoustic model $M_{DE}$. The model selection unit 206 selects the acoustic model with reference to the table as described above. Specifically, the model selection unit 206 selects the acoustic model $M_{AB}$ in the case where the user ID selected by the number conversion unit 216 is AB; it selects the acoustic model $M_C$ in the case where the user ID selected by the number conversion unit 216 is CC; it selects the acoustic model $M_{DE}$ in the case where the user ID selected by the number conversion unit 216 is DE. Namely, the model storage unit 208 stores the different acoustic models for the respective users and the model selection unit 206 selects an acoustic model on the basis of a user, regardless of the current calling number and second number. The above described the process of selecting the acoustic model, and the language model may be selected on the basis of the telephone number as described in the first embodiment, regardless of the user ID.

Figure 11:
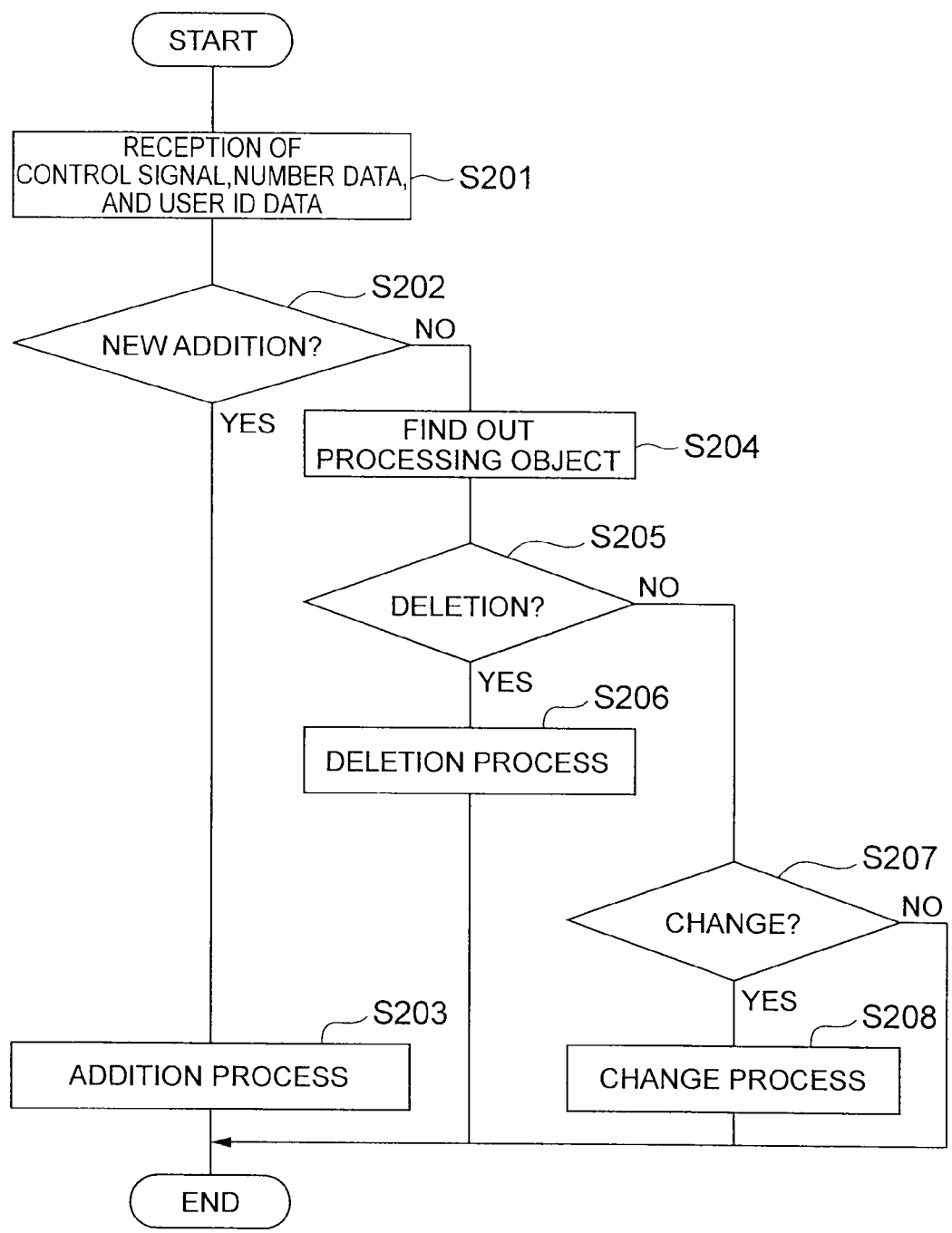
FIG. 11 is a flowchart for detailing each of processes carried out by number control unit 218.

Returning to FIG. 9, the number control unit 218 is a unit that performs each process of addition, change, or deletion in the correspondence relation between telephone numbers and user IDs stored in the number conversion data storage unit 214 (cf. FIG. 10A). FIG. 11 is a flowchart showing a processing procedure thereof. As shown in FIG. 11, the number control unit 218 first receives a control signal, number data, and user ID data (step S201) and then decides a type of the control signal thus received (step S202). The control signal, number data, and user ID data in step S201 may be received from the subscriber information control device 400, or from the telephone equipment 100 or from another device not shown.

Figure 12:
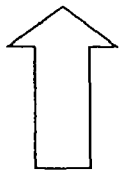
FIGS. 12A and 12B are drawings showing states before and after a new addition process carried out by number control unit 218.

When the result of the decision in step S202 is new addition (step S202: YES), a new addition process is carried out (step S203). FIG. 12A shows an existing table and FIG. 12B shows a table after completion of the new addition process. As shown in FIGS. 12A and 12B, a telephone number F and a user ID of FF corresponding thereto are newly added.

On the other hand, when the result of the decision in step S202 is not new addition (step S202: NO), a processing object is first found out, i.e., which number data in the existing table is to be subjected to a deletion or change process is determined (step S204), and thereafter the type of the control signal received in step S201 is again decided (step S205).

Figure 13:
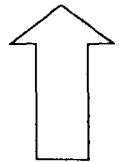
FIGS. 13A and 13B are drawings showing states before and after a deletion process carried out by number control unit 218.

When the result of the decision in step S205 is deletion (step S205: YES), the deletion process is carried out (step S206). FIG. 13A shows an existing table and FIG. 13B a table after completion of the deletion process. As shown in FIGS. 13A and 13B, the telephone numbers D and E, and the user ID of DE corresponding thereto are deleted.

On the other hand, when the result of the decision in step S205 is not deletion (step S202: NO), it is determined whether the control signal received in step S201 indicates change (step S207).

Figure 14:
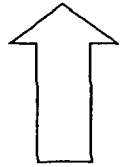
FIGS. 14A and 14B are drawings showing states before and after a change process carried out by number control unit 218.

When the result of the decision in step S207 is change (step S207: YES), the change process is carried out (step S208). FIG. 14A shows an existing table and FIG. 14B a table after completion of the change process. As shown in FIGS. 14A and 14B, the user ID corresponding to the telephone number C was CC before the change, but it is changed to FF after the change.

On the other hand, when the result of the decision in step S207 is not change (step S207: NO), the processing is directly terminated.

The second embodiment described above permits the model selection unit 206 to select the different acoustic models for the respective users. In addition, the second embodiment permits the control of the correspondence relation between telephone numbers and users.

<Third Embodiment>

The third embodiment of the present invention will be described below. The third embodiment will be described with focus on differences from the first embodiment, while omitting the description of redundant portions with the first embodiment described above.

Figure 15:
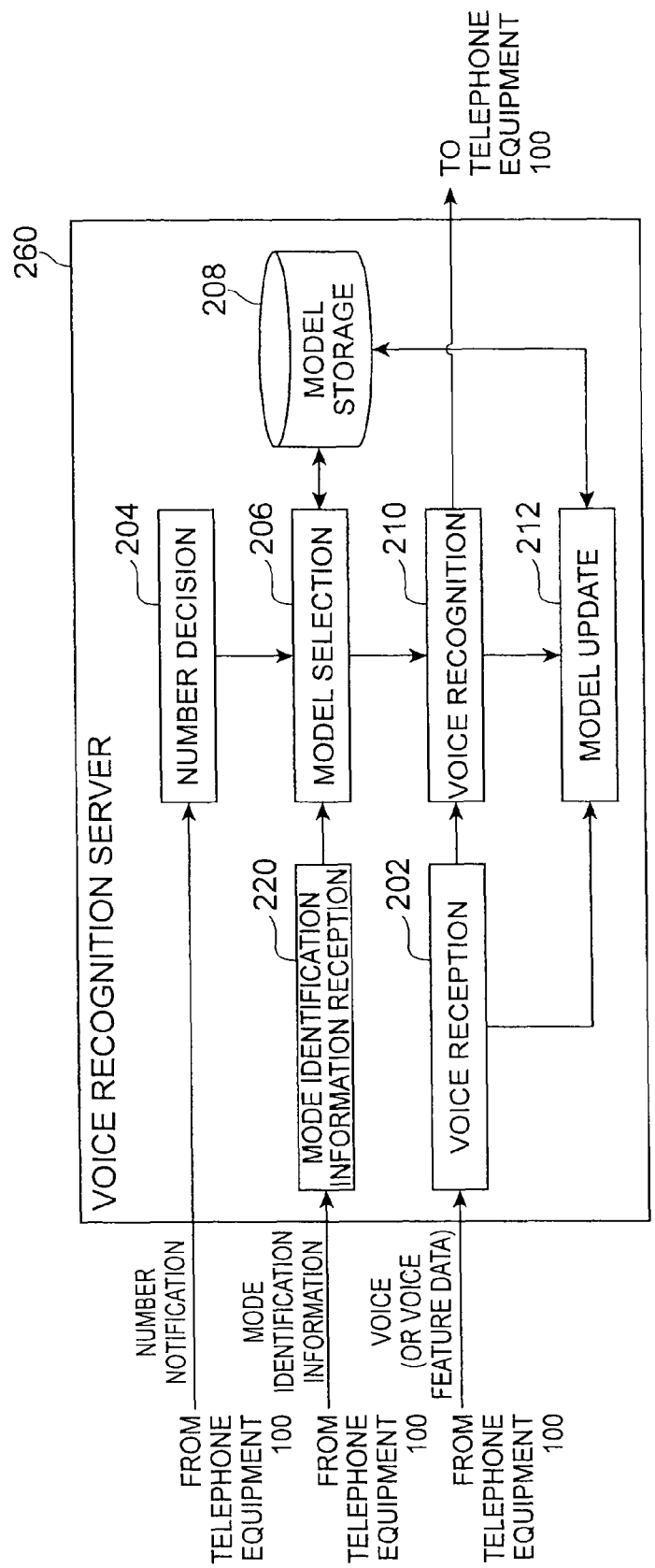
FIG. 15 is a schematic configuration diagram of voice recognition server 260 according to the third embodiment.

FIG. 15 is a schematic configuration diagram of voice recognition server 260 according to the third embodiment. When compared with the voice recognition server 200 in the first embodiment, the voice recognition server 260 is further provided with a mode identification information reception unit 220 (corresponding to "voice receiving module" in claims). The mode identification information reception unit 220 is a unit that receives mode identification information. The mode identification information is information to which the model selection unit 206 refers in order to select the acoustic model and language model. There is, for example, a case where a mode indicated by the mode identification information specifies a telephone number available for the telephone equipment 100. As an example, where the telephone numbers available for the telephone equipment 100 are A and B, a first mode represents the telephone number A and a second mode the telephone number B. A third mode represents both the telephone numbers A and B. The mode identification information indicates one of the modes and the mode identification information reception unit 220 receives the mode identification information from the telephone equipment 100 and outputs it to the model selection unit 206. FIG. 15 shows the example in which the mode identification information reception unit 220 receives the mode identification information from the telephone equipment 100, but, without having to be limited to it, it is also possible to adopt a configuration wherein there is another device (not shown) for storing the mode identification information and wherein the mode identification information reception unit 220 receives the mode identification information from the device.

The model selection unit 206 selects the acoustic model and language model stored in the model storage unit 208, based on the mode identification information received from the mode identification information reception unit 220. For example, in a case where the mode identification information indicates the third mode, the model selection unit 206 selects the acoustic model and language model common to the telephone numbers A and B from the model storage unit 208. The model storage unit 208 preliminarily stores the acoustic model and language model common to the telephone numbers A and B. The acoustic model and language model common to the telephone numbers A and B herein refer to the acoustic model and language model used in both of the voice recognition for the utterance on the telephone number A and the voice recognition for the utterance on the telephone number B, and acoustic model and language model updated using the utterance on the telephone number A, the utterance on the telephone number B, and voice recognition results thereof as learning objects. For example, in a case where the mode identification information indicates the first mode, the model selection unit 206 selects the acoustic model and language model specific to the telephone number A from the model storage unit 208.

The above described the basic functions of the mode identification information reception unit 220 and model selection unit 206 according to the third embodiment, but it should be noted that the third embodiment of the present invention does not always have to be limited to it. For example, when the mode identification information reception unit 220 receives a plurality of pieces of mode identification information, the model selection unit 206 may be configured to select the acoustic model and language model, based on a piece of mode identification information with the high priority rank. In this case, the mode identification information reception unit 220 may be configured to further receive information indicating the priority rank. Furthermore, the server may also be configured so that the mode identification information reception unit 220 further receives attribute information of the user of the telephone equipment 100, in addition to the mode identification information, and so that the model selection unit 206 selects the acoustic model and language model with further reference to the attribute information. The attribute information of the user is information about the user, e.g., information indicative of age, gender, interests, and occupation.

The third embodiment described above permits the model selection unit 206 to select the acoustic model and language model according with the mode. Furthermore, the model selection unit 206 is allowed to select the acoustic model and language model according with the mode, with further consideration to the priority rank of the mode. In addition, the model selection unit 206 is allowed to select the acoustic model and language model according with the attribute information of the user, with further reference to the attribute information of the user.

<Fourth Embodiment>

The fourth embodiment of the present invention will be described below. The fourth embodiment will be described with focus on differences from the first embodiment, while omitting the description of redundant portions with the first embodiment described above.

Figure 16:
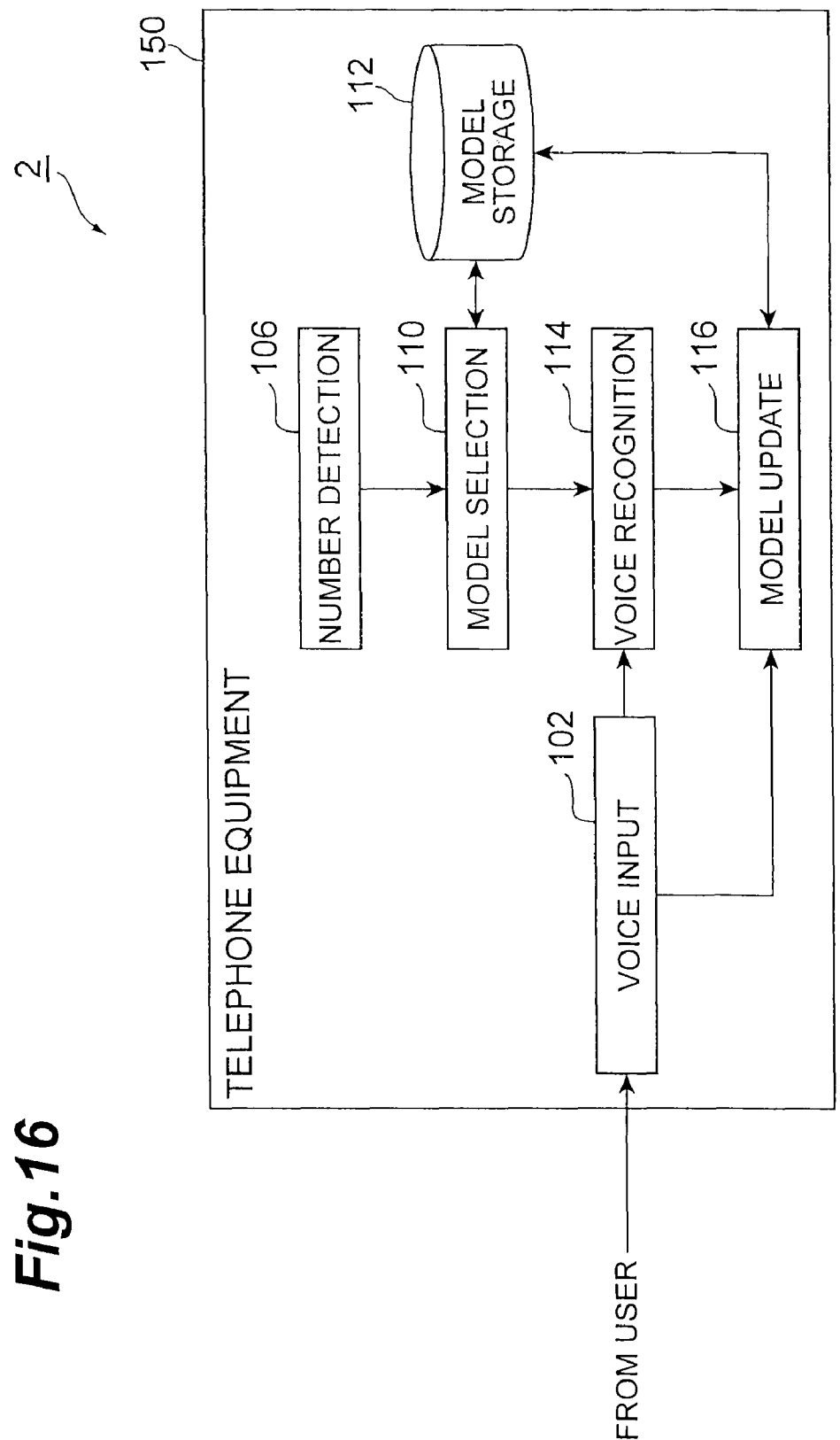
FIG. 16 is a schematic configuration diagram of voice recognition system 2 and telephone equipment 150 according to the fourth embodiment.

FIG. 16 is a schematic configuration diagram of the voice recognition system 2 and telephone equipment 150 according to the fourth embodiment. When compared with the voice recognition system 1 in the first embodiment, the voice recognition system 2 includes no voice recognition server and the telephone equipment 150 performs the voice recognition process instead thereof.

As shown in FIG. 16, the telephone equipment 150 is configured with functional constituent elements of a voice input unit 102 (corresponding to "voice input module" in claims), a number detection unit 106 (corresponding to "number detecting module" in claims), a model selection unit 110 (corresponding to "model selecting module" in claims), a model storage unit 112 (corresponding to "model storing module" in claims), a voice recognition unit 114 (corresponding to "voice recognition module" in claims), and a model update unit 116 (corresponding to "acoustic model updating module" and "language model updating module" in claims).

The voice input unit 102 is a unit that imports a voice uttered by the user and that outputs the voice to the voice recognition unit 114 and to the model update unit 116. The telephone equipment may be further provided with a module for extracting voice features from the voice imported by the voice input unit 102, which is not shown, and the voice feature data is output to the voice recognition unit 114 and to the model update unit 116.

The number detection unit 106 detects the current calling number and second number and outputs them to the model selection unit 110.

The model selection unit 110 selects the acoustic model stored in the model storage unit 112, based on the current calling number and second number detected by the number detection unit 106, and selects the language model stored in the model storage unit 112, based on the current calling number. The model storage unit 112 stores the acoustic model and language model used for converting the voice received by the voice input unit 102, to character data. The model storage unit 112 stores an acoustic model common to all the telephone numbers available for the telephone equipment 150 and the model selection unit 110 selects the common acoustic model even if the current calling number and second number as the basis for the selection are any combination in the telephone equipment 150. The model selection unit 110 outputs the selected acoustic model and language model to the voice recognition unit 114.

The voice recognition unit 114 converts the voice from the voice input unit 102 to character data, based on the acoustic model and language model selected by the model selection unit 110. The voice recognition unit 114 displays the result of the voice recognition process for the user and outputs the result to the model update unit 116.

The model update unit 116 is a unit that updates the acoustic model and language model stored in the model storage unit 112, using the voice from the voice input unit 102 and the voice recognition result received from the voice recognition unit 114, as objects of learning. The model update unit 116 updates the common acoustic model in the telephone equipment 150, using all voices from the voice input unit 102 and all voice recognition results from the voice recognition unit 114 as objects of learning. Specifically, for example, in a case where the telephone numbers available for the telephone equipment 150 are A and B, the model update unit 116 updates the acoustic model common to the telephone numbers A and B in the telephone equipment 150, using all voices uttered on the telephone numbers A and B and the recognition results of the voices as objects of learning.

On the other hand, the model update unit 116 updates the language models for respective telephone numbers, using the voice recognition results discriminated for the respective telephone numbers out of all the voice recognition results from the voice recognition unit 114. Specifically, for example, in the case where the telephone numbers available for the telephone equipment 150 are A and B, the model update unit 116 updates the language model for the telephone number A of the telephone equipment 150, using the recognition result (or character data) of the voice uttered on the telephone number A, as an object of learning. In this case, the model update unit 116 also updates the language model for the telephone number B of the telephone equipment 150, using the recognition result of the voice uttered on the telephone number B, as an object of learning.

In the fourth embodiment described above, the model selection unit 110 of the telephone equipment 150 selects the acoustic model, based on both of the current calling number and the second number. Namely, it selects the acoustic model common to both of the current calling number and the second number. This is because the present invention is based on the premise that the voice recognition is carried out in the telephone equipment 150 for a single user to use a plurality of telephone numbers assigned to one terminal. Namely, the user is fixed even with different telephone numbers, and therefore the use of the common acoustic model enhances the performance of the voice recognition. The use of the common acoustic model offers an excellent effect, particularly, in execution of voice recognition for a voice from a new number of an identical terminal. Namely, it is highly likely in the conventional technology that the update for the available acoustic model is not adequately carried out with a new number, and it is therefore often the case that the performance of the voice recognition for the new number inevitably becomes lower. Since the present invention permits the acoustic model for the existing numbers to be used for the voice from the new number, the accuracy becomes higher for the recognition of the voice from the new number. The use of the common acoustic model allows reduction in the number of acoustic models to be stored in the model storage unit 112 of the telephone equipment 150, which permits reduction in capacity for storage of acoustic models. On the other hand, concerning the language models, the user is assumed to be single, but because topics can differ on respective telephone numbers, the model selection unit 110 of the telephone equipment 150 according to the present invention selects the language model, based on only the current calling number. Namely, it selects the language model specific to the current calling number.

Since the common acoustic model is updated using all voices from the user, the update of the acoustic model can be accurately performed. This is because the amount of learning for the update increases when compared with the case where the acoustic model is updated on a number-by-number basis.

Since the language model per telephone number is updated using the recognition result of the voice on each telephone number, when topics are different on the respective telephone numbers, it is feasible to update the language models specific to the respective topics.

The above described the preferred embodiments of the present invention, but it should be noted that the present invention is by no means limited to the above embodiments.

For example, IMSI (International Mobile Subscriber Identity) numbers in SIM cards (Subscriber Identity Module Cards) can be used instead of the telephone numbers in the above embodiments.

What is claimed is:

1. A voice recognition server connected to a telephone equipment allowed to use a plurality of telephone numbers assigned to a single terminal and configured to convert a voice from the telephone equipment to character data, said voice recognition server comprising:
voice receiving module which receives a voice from the telephone equipment;
model storing module which stores at least one acoustic model and at least one language model used for converting the voice received by the voice receiving module, to character data;
number deciding module which decides a current calling number being a currently calling telephone number of the telephone equipment, and a second number being a telephone number except for the current calling number out of the plurality of telephone numbers;
model selecting module which selects an acoustic model stored in the model storing module, based on the current calling number and the second number, and which selects a language model stored in the model storing module, based on the current calling number; and
voice recognition module which converts the voice received by the voice receiving module, to character data, based on the acoustic model and the language model selected by the model selecting module.

2. The voice recognition server according to claim 1,
wherein the model storing module stores an acoustic model common to all telephone numbers available for one telephone equipment, and
wherein the model selecting module selects the common acoustic model even if the current calling number and the second number as the basis for the selection are any combination in the one telephone equipment.

3. The voice recognition server according to claim 2, further comprising acoustic model updating module which updates the common acoustic model, using all voices from the one telephone equipment.

4. The voice recognition server according to claim 1, further comprising language model updating module which updates language models for respective telephone numbers, using recognition results of voices on the respective telephone numbers out of all voices from the telephone equipment.

5. The voice recognition server according to claim 1, further comprising data storing module which stores the plurality of telephone numbers available for the telephone equipment and user identification information of the telephone equipment in correspondence to each other,
wherein the model selecting module selects the user identification information stored in the data storing module, based on the current calling number and the second number, and selects the acoustic model stored in the model storing module, based on the selected user identification information.

6. The voice recognition server according to claim 5, further comprising correspondence relation controlling module which performs a process of addition, change, or deletion, in a correspondence relation between the plurality of telephone numbers and the user identification information stored in the data storing module.

7. The voice recognition server according to claim 1,
wherein the voice receiving module further receives mode identification information to which the model selecting module refers in order to select the acoustic model and the language model, and
wherein the model selecting module selects the acoustic model and the language model, based on the mode identification information.

8. The voice recognition server according to claim 7, wherein when the voice receiving module receives a plurality of pieces of the mode identification information, the model selecting module selects the acoustic model and the language model, based on a piece of mode identification information with a high priority rank.

9. The voice recognition server according to claim 1,
wherein the voice receiving module further receives attribute information of a user of the telephone equipment, and
wherein the model selecting module selects the acoustic model and the language model with further reference to the attribute information.

10. A voice recognition system comprising a telephone equipment allowed to use a plurality of telephone numbers assigned to a single terminal, and a voice recognition server for converting a voice from the telephone equipment to character data,
wherein the telephone equipment comprises:
voice transmitting module which transmits a voice from a user to the voice recognition server;
number detecting module which detects a current calling number being a currently calling telephone number of the telephone equipment, and a second number being a telephone number except for the current calling number out of the plurality of telephone numbers; and
number notifying module which notifies the voice recognition server of the current calling number and the second number, and
wherein the voice recognition server comprises:
voice receiving module which receives the voice from the telephone equipment;
model storing module which stores at least one acoustic model and at least one language model used for converting the voice received by the voice receiving module, to character data;
number deciding module which decides the current calling number and the second number, based on a notification from the number notifying module of the telephone equipment;
model selecting module which selects an acoustic model stored in the model storing module, based on the current calling number and the second number, and which selects a language model stored in the model storing module, based on the current calling number; and
voice recognition module which converts the voice received by the voice receiving module, to character data, based on the acoustic model and the language model selected by the model selecting module.

11. A voice recognition method in a voice recognition server connected to a telephone equipment allowed to use a plurality of telephone numbers assigned to a single terminal, and configured to convert a voice from the telephone equipment to character data,
wherein model storing module of the voice recognition server stores at least one acoustic model and at least one language model used for converting a voice from the telephone equipment to character data,
said voice recognition method comprising:
a voice receiving step wherein voice receiving module of the voice recognition server receives a voice from the telephone equipment;
a number deciding step wherein number deciding module of the voice recognition server decides a current calling number being a currently calling telephone number of the telephone equipment, and a second number being a telephone number except for the current calling number out of the plurality of telephone numbers;
a model selecting step wherein model selecting module of the voice recognition server selects an acoustic model stored in the model storing module, based on the current calling number and the second number, and selects a language model stored in the model storing module, based on the current calling number; and
a voice recognition step wherein voice recognition module of the voice recognition server converts the voice received by the voice receiving module, to character data, based on the acoustic model and the language model selected by the model selecting module.

12. A telephone equipment allowed to use a plurality of telephone numbers assigned to a single terminal, said telephone equipment comprising:
voice input module which imports a voice from a user;
number detecting module which detects a current calling number being a currently calling telephone number of the telephone equipment, and a second number being a telephone number except for the current calling number out of the plurality of telephone numbers;
model storing module which stores an acoustic model and a language model used for converting the voice imported by the voice input module, to character data;
model selecting module which selects an acoustic model stored in the model storing module, based on the current calling number and the second number, and which selects a language model stored in the model storing module, based on the current calling number; and
voice recognition module which converts the voice imported by the voice input module, to character data, based on the acoustic model and the language model selected by the model selecting module.

13. The telephone equipment according to claim 12,
wherein the model storing module stores an acoustic model common to all the telephone numbers available for the telephone equipment, and
wherein the model selecting module selects the common acoustic model even if the current calling number and the second number as the basis for the selection are any combination in the telephone equipment.

14. The telephone equipment according to claim 13, further comprising acoustic model updating module which updates the common acoustic model, using all voices from the user.

15. The telephone equipment according to claim 12, further comprising language model updating module which updates language models for respective telephone numbers, using recognition results of voices on the respective telephone numbers out of all voices from the user.

* * * * *